APPARATUS FOR PERFORMING A PLURALITY OF WINDINGS

Filed June 30, 1969

INVENTORS
HAROLD W. BENNETT
BARRY E. RICHARDS
BY [signature]
AGENT

Nov. 16, 1971 H. W. BENNETT ET AL 3,619,884

APPARATUS FOR PERFORMING A PLURALITY OF WINDINGS

Filed June 30, 1969 5 Sheets-Sheet 2

INVENTORS
HAROLD W. BENNETT
BARRY E. RICHARDS
BY [signature]
AGENT

Nov. 16, 1971 H. W. BENNETT ET AL 3,619,884

APPARATUS FOR PERFORMING A PLURALITY OF WINDINGS

Filed June 30, 1969 5 Sheets-Sheet 3

INVENTORS
HAROLD W. BENNETT
BARRY E. RICHARDS
BY [signature]
AGENT

APPARATUS FOR PERFORMING A PLURALITY OF WINDINGS

Filed June 30, 1969 5 Sheets-Sheet 4

INVENTORS
HAROLD W. BENNETT
BARRY E. RICHARDS
BY [signature]
AGENT

INVENTORS
HAROLD W. BENNETT
BARRY E. RICHARDS
BY [signature]
AGENT

United States Patent Office 3,619,884

Patented Nov. 16, 1971

3,619,884

APPARATUS FOR PERFORMING A PLURALITY OF WINDINGS

Harold W. Bennett, Stoughton, and Barry E. Richards, Marlboro, Mass., assignors to Raytheon Company, Lexington, Mass.

Filed June 30, 1969, Ser. No. 837,628

Int. Cl. H05k *13/04;* B23p *19/04*

U.S. Cl. 29—203 MW 8 Claims

ABSTRACT OF THE DISCLOSURE

A wiring apparatus including a control console having means for receiving a programmed series of instructions and a wiring machine electrically controlled by the console and having means for continuously moving a fixture below a simultaneously movable head carrying a tube through which a continuous wire is paid out onto the fixture, said fixture having means for guiding the wire through core positions and across terminal pads carried on the fixture.

BACKGROUND OF THE INVENTION

The invention herein described was made in the course of and under a contract or subcontract thereunder, with the U.S. Strategic Systems Projects Office, Department of the Navy.

This invention is related generally to memory storage devices and, more particularly, is concerned with a technique for winding wires through the core positions of a data plane.

A fixed memory storage unit usually comprises a stack of memory planes, each having a plurality of magnetic elements symmetrically disposed in a respective layer of dielectric material. In many fixed memory units, the magnetic elements are circular or square-shaped cores of ferrite material, each forming a closed magnetic path around a respective central aperture. The plurality of ferrite cores in a memory plane form a symmetrical array of bistable memory cells, each capable of being switched from one magnetic remanence state to the other. Generally, the ferrite cores of a fixed memory plane are selectively threaded by a plurality of electrical conductors, called "drive lines," which combine to form wire braid that weaves between the coordinate core positions of the symmetrical array. Each ferrite core threaded by a particular drive line may be switched by a current pulse, of suitable magnitude, passing through that drive line in the proper direction. In fixed memory units of the braided-wire type, each ferrite core in a memory plane is provided with a sense winding which generally comprises several turns of wire around a portion of the core periphery. When a ferrite core is switched, as described, sufficient magnetic flux is generated in the core to induce a voltage pulse in the sense winding coupled to the core. Thus, each memory cell in the symmetrical array functions as a pulse transformer with a drive line serving as a single turn primary, the sense winding representing the secondary and the ferrite core providing the flux linkage therebetween.

In a fixed memory unit, a data word is stored in a group of cores, each core in the group usually representing one character in the word. In a fixed memory plane of the braided-wire type, a plurality of word drive lines share the same group of cores. Each drive line is threaded selectively through some cores and bypassed around other cores of the group in a winding pattern unique to the respective drive line. When a data word is retrieved from the fixed memory unit, a current pulse of suitable magnitude is sent through the associated drive line in the proper direction. The cores that are threaded by that particular drive line are switched and the bypassed cores in the associated group remain unchanged. Generally, a switched core represents a stored binary digit "1," and a bypassed core represents a stored binary digit "0." Thus, the data word is read out of the group of cores by the presence or absence of an induced voltage pulse in the respective sense windings coupled to the cores of the group. Therefore, in a fixed memory plane of braided-wire type, a data word is stored in the geometry of the associated word drive line rather than in the magnetic remanence states of the respective cores in the associated group. Consequently, a plurality of winding patterns are required in order to assign a unique winding pattern to each word drive line in the wire braid of the fixed memory plane.

A number of machines have been developed for automatically winding wires through a plurality of ferrite cores symmetrically disposed in a dielectric board. However, most of these prior art machines are highly complex and unsuitable for production line operation. The task of winding wires through the cores of a memory plane has been eased somewhat by the development of a ferrite core having a removable portion, called a "keeper." During the winding process, the keepers are removed thereby providing openings through which the wires may pass when threading the respective cores of the memory plane. However, winding a braided wire, fixed memory unit is still complicated by the wide variety of winding patterns required for the plurality of drive lines in each memory plane. Furthermore, the identity of each drive line must be maintained throughout the winding process to insure that each drive line, subsequently, will be connected to the proper terminal of the memory plane. In order to thread as many drive lines as possible through the respective core apertures, the wire used for winding the drive lines has a diameter on the order of .003 of an inch, and the coating of insulation on the surface of the wire is only about .001 of an inch thick. Locating a broken or shorted drive line in the wire braid of fixed memory unit is virtually impossible. Consequently, if a fixed memory unit of the braided-wire type develops a short-circuit or an open-circuit in one of the drive lines, the unit usually is discarded. Therefore, it is imperative that the wiring apparatus used in the manufacture of braided-type, fixed memory planes does not weaken the drive lines to the point of breaking and does not produce openings in the insulated coating on the respective drive lines.

SUMMARY OF THE INVENTION

Accordingly, this invention provides a wiring apparatus comprising a control console having sub-units which receive, read, and decode a set of programmed instructions and a wiring machine electrically controlled by the console, said machine having a continuous wire feeding from a suitably tensioned spool through a hollow tube in a reciprocally movable, jogging head and onto a fixture which is carried on a coordinately movable table passing uninterruptedly below the jogging head. The fixture comprises a base plate, a superimposed sheet of dielectric material having opposing rows of equally spaced terminal pads disposed on the upper surface of the sheet, a centrally disposed, symmetrical array of core posts and a plurality of smooth-surfaced guideposts disposed on the fixture where changes in the winding direction are required. Each core post comprises an upright peg having a threaded end journalled into the base plate, a dielectric collar encircling a reduced diameter portion of the peg and a surrounding sleeve of smooth-surfaced, dielectric material. The winding process comprises the steps of continuously winding successive drive lines, passing portions of each drive line over intended termination points, testing the continuously wound wire for electrical continuity, attaching portions of each drive line to respective underlying terminal pads, and removing the respective lengths of wire that interconnect the respective drive lines. The final product comprises a data plane including a layer of dielectric material having opposing extended portions which support respective rows of equally spaced terminal pads, an array of holes extending perpendicularly through the layer of dielectric material and surrounded by respective dielectric collars and a plurality of drive lines embedded in the layer of dielectric material and selectively wound around the respective dielectric collars, each drive line having exposed ends attached to respective terminal pads on respective extended portions of the dielectric layer.

BRIEF DESCRIPTION OF THE DRAWING

For a better understanding of this invention, reference is made to the accompanying drawing wherein.

DESCRIPTION OF THE PREFERRED EMBODIMENT

Figure 1:
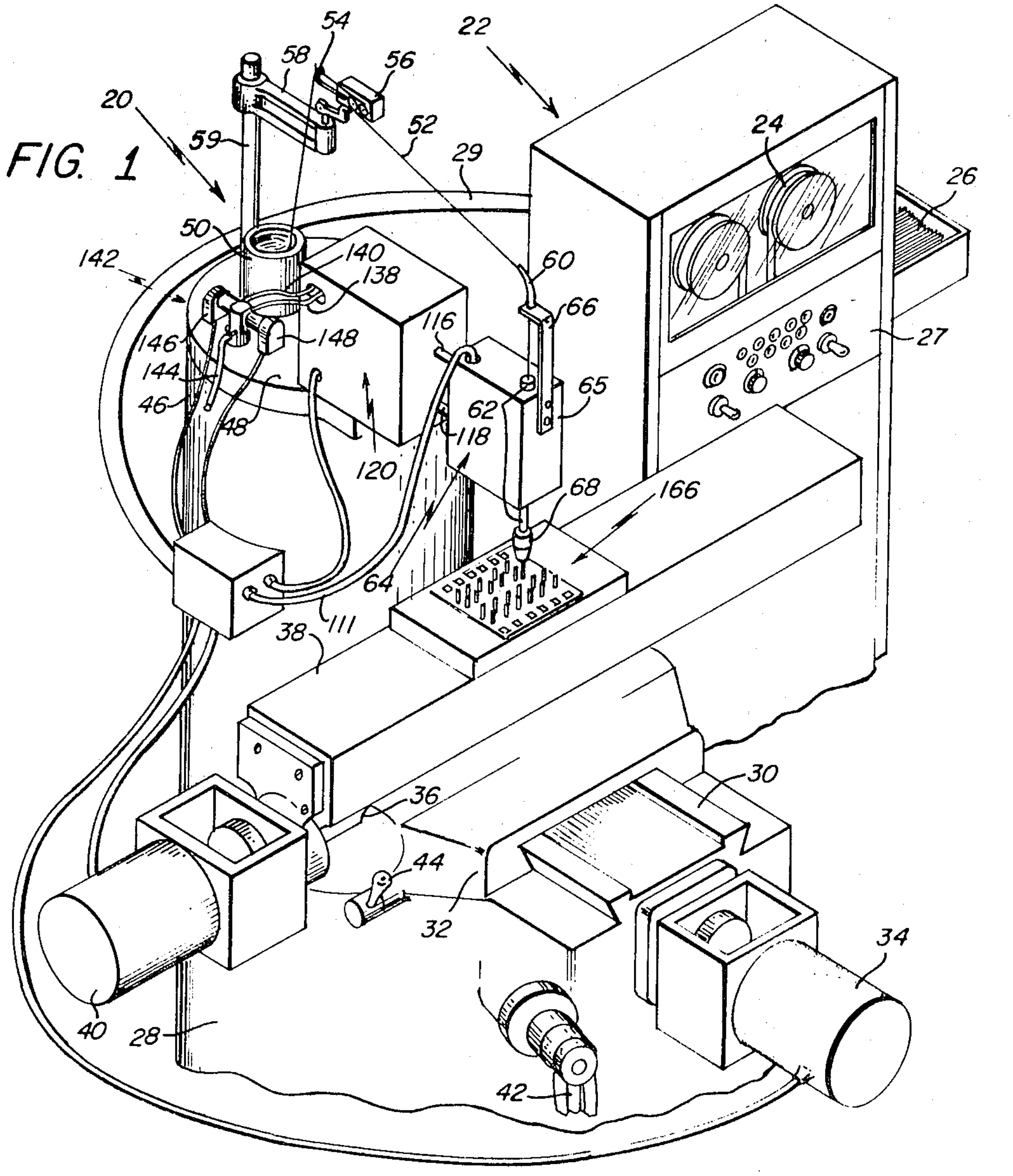
FIG. 1 is an isometric view of the wiring apparatus of this invention.

Referring to the drawing wherein like characters of reference designate like parts throughout the several views, there is shown in FIG. 1, a wiring apparatus which includes a wiring machine 20 and an electrically connected control console 22. The control console 22 is provided with a programmed magnetic tape 24 or a set of coded index cards 26 which are fed automatically into respective reading devices. The resulting electrical signals are fed into a decoder unit 27 which sends corresponding electrical signals through an interconnecting electrical cable 29 to the wiring machine 20 for controlling the machine during the wiring process. The wiring machine 20 comprises a base 28 having a cross slide 30 on the upper surface thereof which supports a slidable carriage 32. The carriage 32 is connected mechanically to an internal lead screw (not shown) which is attached at one end to the shaft of an electrical motor 34. When motor 34 is energized by an electrical signal from the control console 22, the shaft of motor 34 rotates the lead screw and moves the carriage 32 along the cross slide 30 in the Y direction of the winding operation. A bed or channel 36 in carriage 32 supports a slidable table 38 which is mechanically connected to another electrical motor 40 by means of another internal lead screw (not shown). Electrical signals from the control console 22 energize the motor 40 and rotate the attached lead screw to move the table 38 along the channel 36 in the X direction of the winding operation. A crank handle 42 which is fixedly attached to a shaft rotatably supported in the base 28 may be turned manually to raise or lower the table 38. The carriage 32 is locked in place, when necessary, by turning a lever 44 which is secured to a rotatable shaft protruding from the carriage 32.

Behind the movable table 38, a support column 46 extends from the base 28 and terminates in a right angle surface 48 which is located in a plane above the table 38. Disposed on the surface 48 is a cup-shaped container 50 having a spool of wire 52 therein. The wire 52, generally, is made of flexible, conductive material, such as copper, for example, having a diameter of about .003 of an inch and is coated with a thin film of insulating material, such as varnish, for example, which usually is about .001 of an inch thick. The wire 52 extends from the spool in container 50 through an eyelet 54 and a conventional tensioning device 56 which is supported above the container 50 by an arm 58 which is pivotally attached to a column 59. The wire 52 is directed downward toward the table 38 after passing through a length of flexible tubing 60 and a metallic sleeve 62 carried in a jogging head 64. The flexible tubing 60 prevents abrasion of the insulation on the wire 52 as it pases through an aperture in a projecting arm of L-shaped bracket 66 which supports the tubing 60 and is attached at the opposite end to the housing 65 of jogging head 64. As shown more clearly in FIG. 9, the metal sleeve 62 extends vertically downward through the jogging head housing 65 and terminates below the housing in a chuck 68 which holds a hollow needle 70 in spaced, perpendicular relationship over the table 38. The wire 52 passes through the hollow needle 70 and emerges from a length of flexible tubing 72 which is force-fitted onto the lower end of needle 70. The tubing 72 acts as a flexible nozzle which bends easily when the wire 52 changes direction during the winding process, thereby preventing abrasion of the wire against the circular rim of needle 70.

Figures 8, 9, 10:
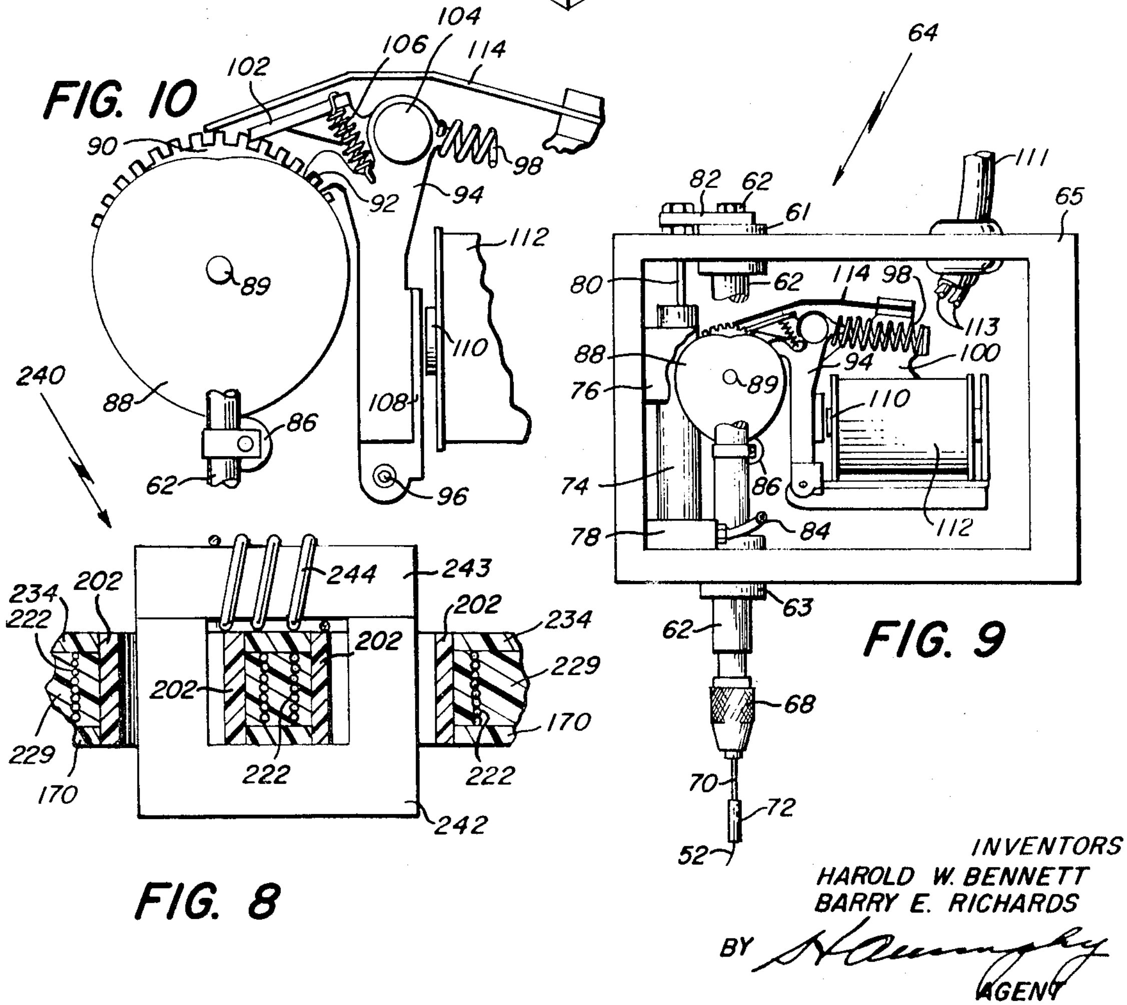
FIG. 8 is an enlarged, elevational view, partly in section, of one core position in the memory plane shown in FIG. 7.
FIG. 9 is an elevational view of the jogging head shown in FIG. 1 with a side cover removed.
FIG. 10 is an enlarged view of the indexing mechanism shown in FIG. 9.

Referring to FIGS. 9 and 10, in a jogging head housing 65, an air cylinder 74 is supported in parallel, spaced relationship with the metal sleeve 62 by two mounting brackets 76 and 78 respectively. Protruding from the upper end of air cylinder 74 is a centrally disposed piston shaft 80 which extends through an aperture (not shown) in the housing 65. The external end of shaft 80 is attached to one end of a perpendicularly disposed bar 82 which is secured at the opposite end to the metallic sleeve 62. Compressed air enters the cylinder 74 through a supply line 84 located at the base of the cylinder and produces an upwardly directed force on piston shaft 80 which is transmitted through the bar 82 to the metallic sleeve 62. The sleeve 62 is slidably supported in bearings 61 and 63, respectively, and as a result of the upwardly directed force on sleeve 62, a roller 86 mounted on the sleeve 62 bears against the periphery of a heart-shaped cam 88. The cam 88 is secured to one end of shaft 89 which is fixedly attached to the central portion of a ratchet gear 90 whereby gear 90 rotates the cam 88 in small angular increments. The ratchet gear 90 is locked in place by an intermeshing notch 92 in a projecting portion of an arm 94 which is rotatably supported at the opposite end by means of a pin shaft 96. The notch 92 is urged toward an interlocking tooth on the periphery of ratchet gear 90 by a compression spring 98 having one end mounted on the arm 94 and an opposite end secured to a fixed support bracket 100. A pawl 102 is pivotally supported at one end by a pin 104 in arm 94 and, at the opposite end, is pressed against a tooth of ratchet gear 90. The pawl 102 is held against the periphery of ratchet gear 90 by a tension spring 106 having one end attached to the pawl 102 and the other end attached to arm 94. A right angle plate 108 extends from the arm 94 into close-spaced, parallel relationship with an exposed end 110 of a magnetically permeable core in a solenoid 112. By means of electrical conductors 113 in cable 111, electrical signal pulses from the control console 22 engerize the solenoid 112 periodically during the wiring operation. Consequently, the plate 108 of rotatable arm 94 is magnetically attracted toward the exposed end 110 of the core in solenoid 112 and rotates arm 94 thereby compressing spring 98. Rotation of arm 94 withdraws the notch 92 and the pawl 102 from engagement with the teeth of ratchet gear 90. An anti-backlash leaf spring 114 having one end fixedly attached to support bracket 100 maintains a pressure against the periphery of ratchet gear 90 at the opposite end to prevent the gear 90 from turning while disengaged from the pawl 102 and the notch 92. The tension spring 106 pulls the disengaged end of pawl 102 downward into alignment with the next tooth in clockwise rotation around the gear 90. When the solenoid 112 is deenergized by the control console 22, the compression spring 98 drives the rotatable arm 94 toward the gear 90 and the pawl against the newly aligned tooth of the ratchet gear. Consequently, the gear 90 rotates a small increment in the counter-clockwise direction and the notch 92 interlocks with a newly aligned tooth on the periphery of the ratchet gear 90. As a result, the cam 88 is rotated a small increment and the roller 86 which is attached to metallic sleeve 62 rises a slight amount. Therefore, the needle 70 which is mounted in the lower end of metallic sleeve 62 is drawn away from the movable table 38 to prevent the needle 70 from interfering with the build-up of wire layers during the winding process. After the winding process is completed, the solenoid 112 is energized repeatedly by a series of electrical current pulses from the control console 22. As a result, the ratchet gear 90 continues to rotate the attached cam 88 counterclockwise, in successive angular increments, until the roller 86 is returned to the position shown in FIGS. 9 and 10. Thus, the needle 70 is lowered toward the table 38 until the nozzle 52 is disposed closely adjacent thereto for the start of the next winding process.

Figure 2:
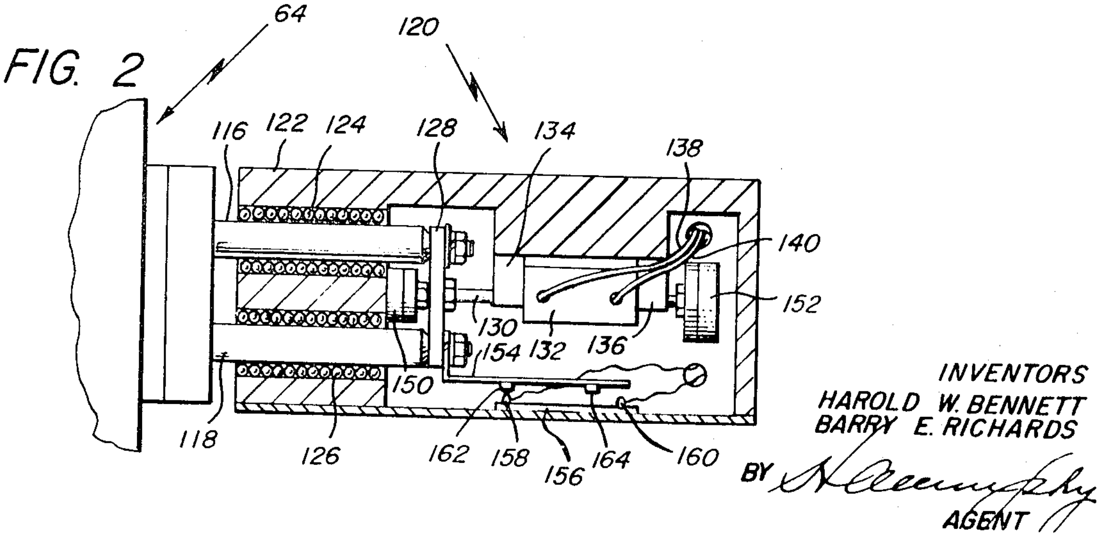
FIG. 2 is a longitudinal sectional view of the jogging head control unit shown in FIG. 1.

Referring to FIGS. 1 and 2, the jogging head 64 is positioned over the coordinately moving table 38 by two, parallel shafts 116 and 118 which protrude from a jogging control unit 120 mounted on the surface 48 of column 46. The shafts 116 and 118 extend into the housing 122 of jogging control unit 120 and are slidably supported therein by respective roller bearings 124 and 126. The respective inner ends of the shafts 116 and 118 are attached to opposite ends of a metal bar 128 which is secured, at the central portion thereof, to a shaft 130. The shaft 130 extends through an air cylinder 132, protruding from the opposite end thereof, and is slidably supported at opposite ends of the air cylinder 132 by bearings 134 and 136 respectively which are fixedly attached to the jogging control housing 122. Two air hoses 138 and 140, respectively, are connected to the cylinder 132, one adjacent each end thereof, and pass through an aperture in housing 122 to connect to respective ports of an externally located valve 142. The valve 142 is an electrically controlled type, such as Model VDS–PK, made by the Allenair Corporation of Mineola, N.Y., which is a double solenoid, two-way valve. Compressed air is supplied to the central portion of the valve through a connecting hose 144. When an electrical signal from the control console 22 energizes a solenoid 146 located on the left side of the valve assembly, the internal valve is positioned to connect the compressed air from supply hose 144 to the hose 138 and to connect the hose 140 to an exhaust port (not shown). Alternatively, when an electrical signal from the control console 22 energizes a solenoid 148 located on the right side of the valve assembly, the internal valve is positioned to connect the compressed air from supply hose 144 to the hose 140 and to connect the hose 138 to the exhaust port. Depending on the direction of air flow into the cylinder 132, an internal piston (not shown) which is carried on the shaft 130 is driven reciprocally toward one end of the cylinder 132. The distance travelled by the piston is very short, generally on the order of one-half an inch, and this reciprocal motion of the shaft 130 is transmitted through the attached bar 128 and the parallel shafts 116 and 118 to the jogging head 64. As a result, the jogging head moves correspondingly short distances in the Y direction during the winding operation. Respective disks 150 and 152 of resilient material, such as polyurethane, for example, are affixed to opposite ends of the shaft 130 to butt yieldingly against adjacent surfaces of the jogging control housing 122 when the shaft 130 reaches the limit of travel in one direction or the other. When the disk 150 is pressed against the adjacent surface of housing 122, as shown in FIG. 2, the jogging head is said to be in the "out" position. On the other hand, when the disk 152 is pressed against the adjacent wall surface of the housing 122, the jogging head is said to be in the "in" position. An L-shaped bracket 154 is fixedly attached to the inner end of shaft 118 and is disposed in spaced, parallel relationship with a bracket 156 which is fixedly attached to the adjacent wall of housing 122. The plate 156 supports two spaced, parallel reed switches 158 and 160, respectively, and the bracket 148 carries two correspondingly spaced, parallel bar magnets 162 and 164 respectively. When the jogging head 64 reaches the "out" position, as shown in FIG. 2, the bar magnet 162 is disposed in opposing relationship with the reed switch 158, thereby magnetically closing the switch 158 to send an electrical signal to the control console 22 indicating that the jogging head 64 is in the "out" position. Conversely, when the jogging head 64 moves reciprocally and reaches the "in" position, the bar magnet 162 is no longer disposed in opposing relationship with the reed switch 158 and the switch 158 is open. However, the bar magnet 164 is then disposed in opposing, spaced relationship with the reed switch 160, thereby magnetically closing the switch 160 to send an electrical signal to the control console 22 indicating that the jogging head 62 is in the "in" position.

Figure 11:
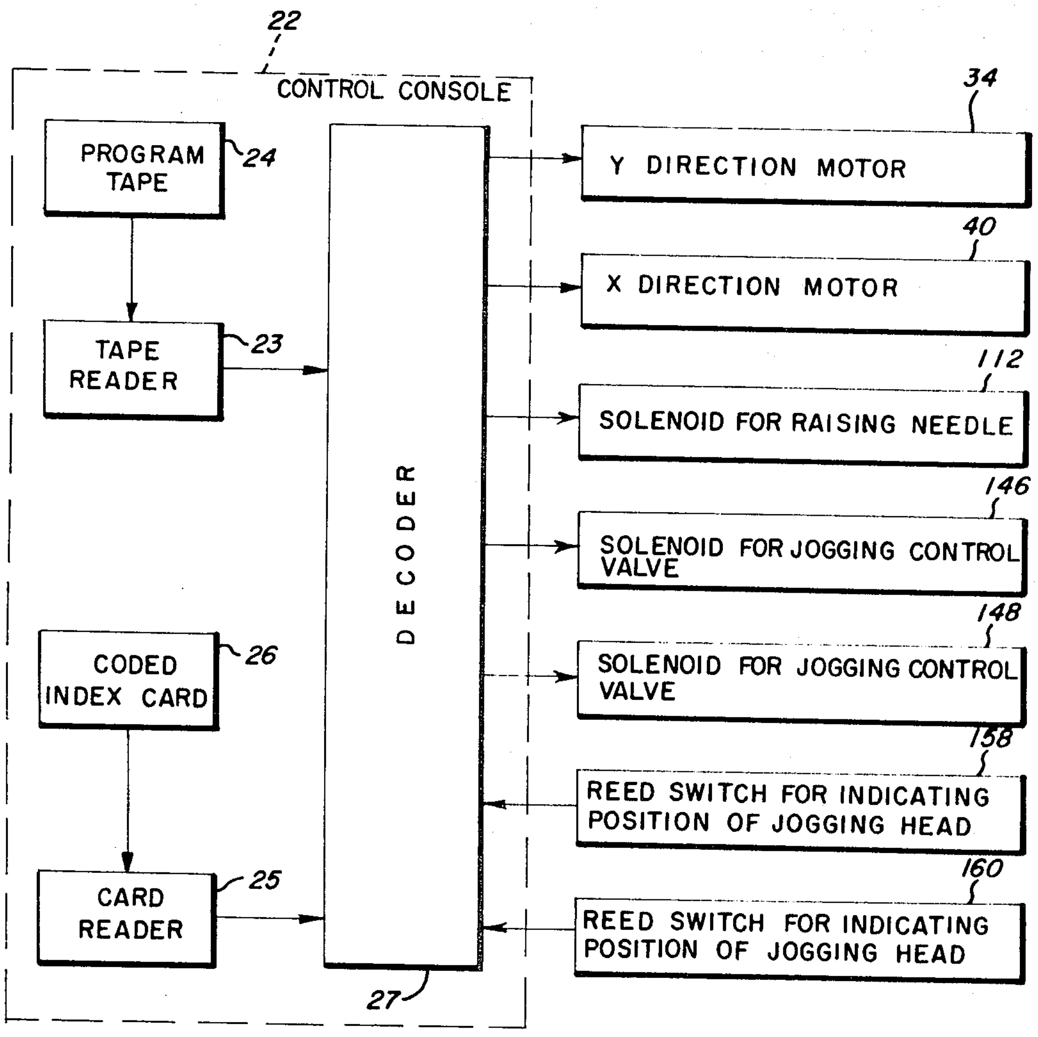
FIG. 11 is a schematic diagram of the electrical connections between the control console and various components of the wiring machine.

As shown in FIG. 11, in control console 22, programmed instructions are read by a tape reader 23 from a program tape 24 or by a card reader 25 from a set of coded index cards 26, and the resulting electrical signals are sent to a decoder unit 27 in the control console 22. In the decoder unit 27, the electrical signals are transformed into suitable electrical instructions for the various electrically operated components on the wiring machine 20. Thus, the decoder unit 27 allows electrical current to flow to the motor 40 when the winding operation requires that the table 38 be moved in the X direction and deenergizes motor 40 when the table 38 is positioned properly, in the X direction, under the needle 70. Similarly, the decoder unit 27 allows electrical current to flow to the motor 34 when the winding operation requires that the table 38 be moved in the Y direction and deenergizes motor 34 when the table 38 is positioned properly, in the Y direction, under the needle 70. Moreover, the decoder unit 27 allows electrical current to flow simultaneously to both motors 40 and 34, respectively, when the winding operation requires that the table 38 move at an angle with respect to the X and Y directions. As the winding operation proceeds, the decoder unit 27 periodically sends an electrical current pulse to the solenoid 112 in the jogging head 64, thereby raising the needle 70 a discrete distance above the table 38 each time the solenoid 112 receives a pulse of electrical current, as described previously. At predetermined times during the winding process, the decoder unit 27 electrically energizes the solenoid 146 of valve 142, thereby causing the air cylinder 132 in jogging control unit 120 to move the jogging head 64 to the "out" position. When the jogging head 64 is in the "out" position, the reed switch 158 in the jogging control unit 120 sends an electrical signal to the decoder unit 27 indicating the correct position of the jogging head 64. Also, at preselected times, during the winding process, the decoder unit 27 electrically energizes the solenoid 148 of valve 142 thereby causing air cylinder 132 in jogging control unit 120 to move the jogging head 64 to the "in" position. When the jogging head 64 is in the "in" position, the reed switch 160 sends an electrical signal to the decoder unit 27 indicating the correct position of the jogging head 64. Alternatively, the movable table 38 and the jogging head 64 may be controlled by separate programmed means, such as the tape 24 and the index cards 26 respectively, for example. In that case, the operation of jogging head 64 may be synchronized with the respective movements of table 38 by an alignment indicating means (not shown), such as a light source and a photoelectric cell, for example.

A fixture 166 is secured to the upper surface of the coordinately movable table 38 by conventional means, as by clamps (not shown), for example. As illustrated more clearly in FIGS. 3 and 4, the fixture 166 comprises a base plate 168 of metallic material, such as aluminum, for example, and a superimposed sheet 170 of dielectric material, such as epoxy glass cloth, for example. Parallel edges 172 and 173, respectively, of the sheet 170 are disposed in the X direction of the winding operation, thereby orienting the parallel edges 174 and 175 of sheet 170 in the Y direction. Edges 172 and 173 of sheet 170 are positioned in spaced, parallel relationship with respective series of equally spaced holes 176 tapped in the base plate 168. Cylindrical posts 178 of metallic material, such as stainless steel, for example, are provided with respective threaded ends 179 which are journalled into respective holes 176. Thus, two parallel rows of upright posts 178 are formed and extend in the X direction of the winding process, one adjacent each of the edges 172 and 173, respectively, of the sheet 170. The posts 178 serve as guides for effecting a change in direction during the winding process. The wire 52 winds smoothly around the guideposts 178, thereby preventing the formation of sharp bends or kinks which weaken the wire and ultimately cause open-circuits in the wire braid. The surfaces of the guideposts 178 are polished to a high degree of smoothness to avoid removing insulation from the surface of the wire 52 and producing a short-circuit in the final product. A series of equal spaced pads 180 is disposed on the upper surface of sheet 170 adjacent the edge 172, and a corresponding series of pads 181 is disposed adjacent the edge 173, each pad 180 being aligned in the Y direction with a corresponding pad 181. The pads 180 and 181 comprise respective thin layers of metallic material, such as nickel, for example, which are attached to the sheet 170 by conventional means, such as plating, for example. Each pad 180 and 181, respectively, is centrally aligned in the Y direction with a post 178 disposed closely adjacent the associated edge of sheet 170. Adjacent the inner edge of each pad 180 and 181 and centrally aligned therewith is a respective post 182. Consequently, each post 182 is aligned, in the Y direction, with a respective post 178 disposed on the opposite side of a respective intervening pad. The posts 182 have the same structure and surface finish as the guideposts 178 and serve the same function. Each guidepost 182 is provided with a threaded end 184 which is passed through a respective closely fitting aperture 186 in the sheet 170 and is journalled into an aligned hole 188 in the base plate 168. Thus, two rows of upright guideposts 182 are formed which extend in the X direction in spaced parallel relationship with the rows of guideposts 178.

Disposed between the two parallel rows of guideposts 182 are four parallel rows, 191–194 respectively, of core posts 190. Each core post 190 comprises a cylindrical peg 196 of rigid material, such as plastic coated steel, for example, which has a reduced diameter portion 198 located adjacent a threaded end 200. A collar 202 of dielectric material, such as polystyrene, for example, slidingly engages the reduced diameter portion 198 and has an outer diameter which is less than the diameter of peg 196. The threaded end of each peg 196 projects through a respective hole 204 in the sheet 170 and is journalled into an aligned hole 206 in the base plate 168. As a result, the collar 202 is pressed into the closely fitting diameter of hole 204 until the leading edge thereof is flush with the lower surface of the sheet 170. A sleeve 208 of smooth dielectric material, such as polyethylene, for example, is slid over the outer diameter of each upright peg 196 until the leading edge of the sleeve butts against the upper surface of the sheet 170. Thus, the four parallel rows 191–194 respectively, of core posts 190 are formed, each extending in the X direction in parallel, spaced relationship with one another and with the parallel rows of guideposts 178 and 182 respectively. The respective core posts 190 in each row 191–194 are equally spaced apart in corresponding relationship, and a core post 190 in one row is aligned, in the Y direction, with respective corresponding core posts 190 in the other rows. Furthermore, the respective core posts in each row 191–194 respectively are equally spaced in corresponding relationship with the rows of guideposts 182 and rows of guidepost 178 adjacent the respective edges 172 and 173 of the sheet 170. Hence, each core post 190 is aligned, in the Y direction with a guidepost 178, a pad 180 and a guidepost 182 on opposite sides of the sheet 170. Thus, it can be seen that the core posts 190, guideposts 178, pads 180 and guideposts 182 are disposed in a symmetrical pattern whereby each position in the symmetrical array can be defined by X and Y coordinates.

Corresponding core posts 190 in the rows 191 and 192 represent opposing portions of respective magnetic cores in the final assembly. Consequently, core posts 190 of the respective rows 191 and 192 that are alinged in the Y direction define respective magnetic core positions in the completed assembly. Similarly, core posts 190 of the rows 193 and 194 that are aligned in the Y direction, also define respective magnetic core positions in the final product. Thus, the pair of opposing core posts 190 on the left-hand end of the respective rows 191 and 192 represents core position 1, and similar pairs of core posts to the right thereof are designated as core positions 2, 3, etc. The core position on the right-hand end of the respective rows 191 and 192 is designated, in this case, as core position 6. However, it is to be understood that additional core positions can be added by increasing the dimension of sheet 170 and base plate 168 in the X direction. Because of the continuous winding process to be described herein, the core position on the right-hand end of the respective rows 193 and 194 is designated as core position 7, and successive core positions to the left thereof are designated as 8, 9, etc. The core position on the left-hand end of the respective rows 193 and 194 is designated, in this case, as core position 12. However, it is to be understood that additional core positions can be added by increasing the dimension of sheet 170 and base plate 168 in the Y direction. Where the wire 52 passes between the parallel core posts 190 of a core position, 1–12 respectively, the magnetic core disposed in that position at final assembly will be threaded by the wire 52. Consequently, an electrical signal current travelling through the wire will magnetically switch the threaded core and produce a pulse voltage in the sense winding of the core which will indicate a binary digit 1 for that core position. On the other hand, where the wire 52 does not pass between the parallel core posts 190 of a core position, 1–12 respectively, an electrical signal current passing through the wire will not switch the bypassed core. Consequently, the absence of a voltage pulse in the sense winding of the bypassed core will indicate a binary digit 0 for that core position. A guidepost 210 is disposed in spaced, parallel relationship with the core post 190 on the left-hand end of row 191, and another guidepost 212 is disposed in further spaced, parallel relationship with the core post 190 on the right-hand end of row 191. Aligned in the Y direction with the guidepost 212 is a guidepost 214 which is also aligned in the X direction with the respective core posts 190 of row 194. On the opposite end of row 194, a guidepost 216 is aligned in the X direction with the respective core posts 190 of row 194 and in the Y direction with the guidepost 210. Disposed in spaced, parallel relationship with the core post 190 on the right-hand end of row 192 is a guidepost 218 which is aligned in the X direction with the respective core posts 190 of row 192. Aligned with the guidepost 218 in the Y direction is another guide 220 which also is aligned in the X direction with the respective core posts 190 of row 193. The respective guideposts 210–220 are similar in structure and appearance to the core posts 190 but perform the same function as the guideposts 178 and 182 respectively.

Figure 3:
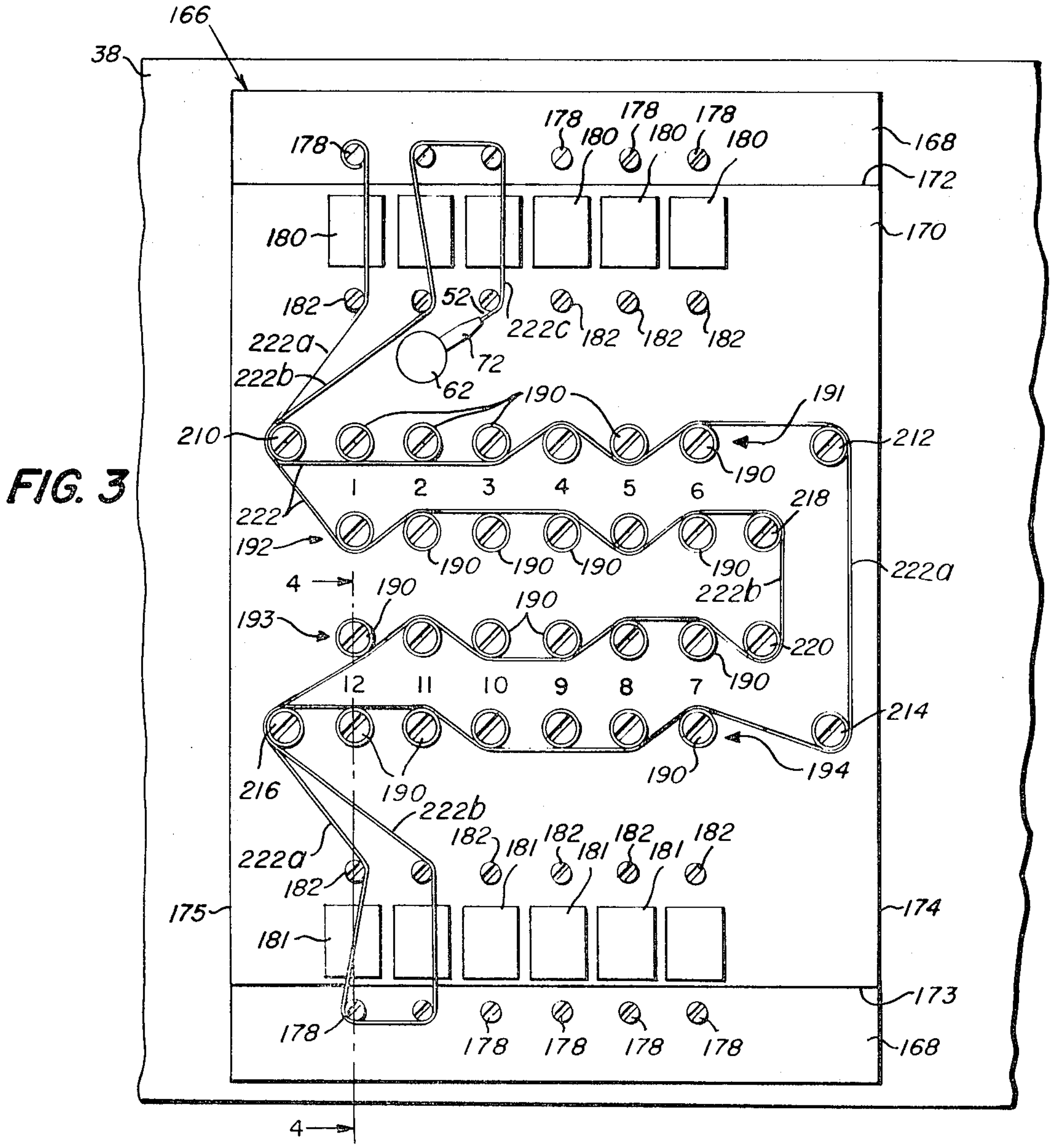
FIG. 3 is a fragmentary plan view of the table and fixture shown in FIG. 1.
Figure 4:
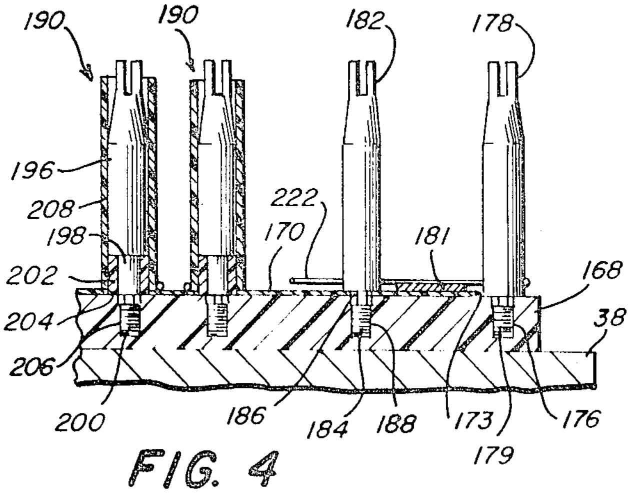
FIG. 4 is a fragmentary elevational view, partly in section, taken along lines 4—4 of FIG. 3 looking in the direction of the arrows.

When operating the described wiring apparatus, a programmed tape 24 or a set of coded inde cards 26 is inserted into the appropriate reading device of the control console 22. The tape 24 or the set of index cards 26 contains the necessary electrical instructions that will be conducted to the wiring machine 20 for winding the wire 52 in a predetermined manner. The free end of wire 52 projecting through the flexible nozzle 72 of needle 70 is attached to a pad 180 or 181 on the sheet 170 by any convenient means, such as with adhesive tape (not shown), for example. In FIG. 3, the free end of the wire 52 is shown attached to the solder pad 180 on the left-hand end of the row adjacent the edge 172 of sheet 170. Electrical signals received from the control console 22 energize the electrical motor 34 which moves the table in the Y direction. Consequently, the fixture 166 attached to the upper surface of table 38 moves under the jogging head 64 and the wire 52 is drawn from the container 50, under tension, and through the hollow needle 70. When the needle 70 is positioned to the right of guidepost 182, adjacent the inner edge of the selected pad 180, the control console sends electrical signals to the electrical motor 40 which moves the table 38 in the X direction and the electrical motor 34 which continues to move the table 38 in the Y direction. Consequently, the fixture 166 travels under the needle 70 at an angle until the guidepost 210 is positioned to the right of the needle. At this time, the control console 22 sends an electrical signal to the electrically operated valve 142 which causes the piston in air cylinder 132 to move the jogging head 64 to the "out" position. The control console 22 deenergizes the motor 34 which stops further movement of the table 38 in the Y direction and continues to energize the motor 40 which moves the table 38 in the X direction under the needle 70 carried by the jogging head 64. As a result of the jogging head 64 being in the "out" position, the wire 52 paying out of the needle 70 is threaded through core positions 1, 2 and 3. Prior to core position 4, the control console 22 energizes the electrically operated valve 142 and causes the jogging head 64 to be moved to the "in" position, thus bypassing core position 4 as the table 38 continues to move the fixture 166 in the X direction and under the needle 70. The control console 22 then energizes the electrically operated valve 142 to move the jogging head 64 to the "out" position, and as the table 38 moves the fixture 166 under the needle 70 and in the X direction, the wire 52 is threaded between the parallel core posts 190 of core position 5. Similarly, the jogging head 64 is moved to the "in" position in order to bypass core position 6. Thus, it is apparent that the electrical motor 40 moves the table 38 steadily in the X direction under needle 70 while the jogging head 64 moves reciprocally between the "in" and "out" positions to thread or bypass the core positions, 1–12 respectively.

When the needle 70 is positioned to the right of the guidepost 212, the control console 22 deenergizes the electrical motor 40 which stops further movement of the table 38 in the X direction and energizes electrical motor 34 which moves the table 38 and the attached fixture 166 in the Y direction. When the needle 70 is positioned to the right of the guidepost 214, the control console deenergizes electrical motor 34 and re-energizes electrical motor 40 to move the table 38 in the X direction along the respective core posts 190 of row 194. As the fixture 166 passes under the needle 70, electrical signals from the control console 22 move the jogging head 64 between the "in" and "out" positions to thread core positions 7, 11 and 12 and bypass core positions 8, 9 and 10, respectively. When the needle 70 is positioned to the left of the guidepost 216, the control console energizes both motors 34 and 40, respectively, to move the table 38 at an angle until the needle 70 is positioned, to the right of a guidepost 182. The electrical signals from the control console 22 to the motors 34 and 40 are suitably altered to cause the wire 52 to wind smoothly around the right-hand side of guidepost 182, across the aligned pad 181 and around the left-hand side of the aligned guidepost 178. This completes the winding of the first word drive line **222*a* which, subsequently, will be terminated, at one end, on the underlying pad 180 and, at the other end, on the underlying pad 181, as by soldering, for example. However, during the winding operation, the uninterrupted movement of table 38, in accordance with electrical signals received from the control console 22, extends the continuous wire 52 in the X direction to the next guidepost 178**.

After winding around the right-hand side of the next guidepost 178, a second word drive line **222*b* is started by passing the wire 52 over the aligned solder pad 181 and around the aligned guide post 182 to the guidepost 216. The second drive line 222*b* may thread or bypass the respective core positions 1–12 by traveling along rows 191 and 194 as in the case of the first drive line 222*a*. Alternatively, the second drive line 222*b* may thread or bypass the respective core positions 1–12 by passing along the rows 193 and 192 as shown in FIG. 3. When winding the second drive line 222*b*, the electrically operated valve 142 is actuated to move the jogging head 64 to the "out" position for threading the wire 52 through the core positions 12, 10, 9 and to the "in" position for bypassing the core positions 11, 8 and 7. After the wire 52 passes around the guideposts 220 and 218, the jogging head 64 is moved to the "in" position to thread the second drive line 222*b* through core positions 6, 4, 3 and 2 and moved to the "out" position to bypass core positions 5 and 1. The second drive line 222*b* then passes around the guidepost 210 to extend to a guidepost 182 on the right-hand side of the first drive line 222*a*. After winding around the guidepost 182, the wire 52 crosses over an aligned pad 180 and extends to an aligned guidepost 178. Similar to the first drive line 222*a*, the pads 180 and 181 underlying portions of the second drive line 222*b* are intended as terminating points for opposite ends of the drive line after the entire winding process is completed. The uninterrupted movement of the table 38 under the needle 70 results in the wire 52 extending in the X direction to the next guidepost 178 to the right of drive line 222*b*. From there a third drive line 222*c* is started by the wire 52 winding around the guidepost 178, across the aligned pad 180 and around the aligned guidepost 182**.

Thus, when practicing this invention, a plurality of word drive lines 222, each having a unique winding pattern, can be wound successively in one continuous operation until the entire winding process is completed. Each terminal pad is crossed only by the word drive line which will be terminated on the respective pad thus eliminating the need for identifying the respective ends of each drive line in the wire braid for subsequent attachment to respective terminal members. This continuous winding process results in a progressive buildup of wire layers on the fixture 166 as it travels back and forth beneath the needle 70. Consequently, the needle 70 is raised slowly as the winding process proceeds. This is accomplished by inserting a coded instruction, at regular intervals, in the programmed sequence of tape 24 or the index cards 26 in the control console 22. As explained previously, each time the solenoid 112 is energized, the needle 70 is raised a small increment in the vertical direction. Thus, interference of the needle 70 with the buildup of wire layers on the fixture 166 is avoided. The wire layers on the fixture 166 form a woven wire braid which comprises a plurality of word drive lines 222. The word drive lines 222, shown in FIG. 3, illustrate typical winding patterns which make each word drive line unique in the braided-type memory unit. The geometry of the first word drive line 222*a* permanently stores data represented by the digital sequence 111010100011, and the geometry of the second word drive line 222*b* permanently stores data represented by the digital sequence 011101001101. Thus, it can be seen that the wiring apparatus described herein is adapted to wind a plurality of word drive lines in the required variety of winding patterns for a braided-type, fixed memory unit. Changes or corrections can be made in the winding sequence by either exchanging the tape 24 for another having the required changes programmed therein or by changing one or more cards in the set of index cards 26.

Figure 5:
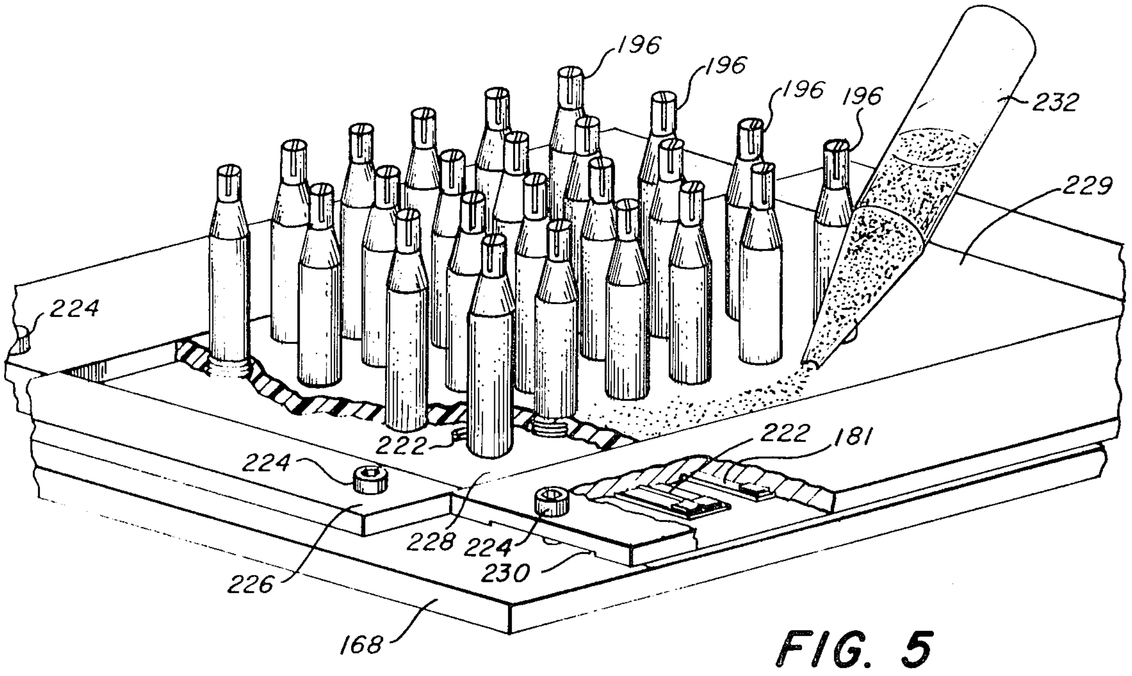
FIG. 5 is an isometric view of the fixture shown with a potting frame attached thereto.

After the winding process is completed, the wire 52 is clipped at the last guidepost 178 and the entire fixture 166 is removed from the table 38 of the wiring machine 20. The continuous wound wire 52 on the fixture 166 is given an electrical continuity test to determine if a break has occurred in the wire during the winding process. An alternative and more preferable method is to constantly monitor the continuity of the wire 52 during the winding process and to provide means for stopping the wiring apparatus if a break in the wire 52 does occur. If the wound wire 52 passes the electrical continuity test, the wire is attached to the respective pads 180 and 181 by conventional means, as by soldering, for example. The respective lengths of wire 52 between adjacent guideposts 178 are clipped at the outer edges of the associated pads and discarded. Thus, each word drive line 222 in the woven wire braid is terminated at one end on a respective pad 180 and at the other end on a respective pad 181. At this time, all the guideposts 178, 182 and 210–220 are removed from the fixture 166. Also, the sleeves 202 surrounding the pegs 196 of the respective core posts 190 are removed. As shown more clearly in FIG. 6, when the respective sleeves 202 are removed, the word drive lines 222 lay loosely around the respective collars 200 which encircle the pegs 196. As shown in FIG. 5, a potting frame 226 is secured to the upper surface of fixture 166, as by screws 224, for example, thereby forming a mold cavity 228 on the surface of sheet 170. The potting frame 226 may be made in one integral piece or may have two or more abutting or intermeshing portions. The opening in frame 226 is just large enough to include within the mold cavity the apertures 186 in sheet 170 which were formerly occupied by the guideposts 182. Respective channels 230 are provided in the lower surface portions of frame 226 which overlay the respective rows of terminal pads 180 and 181. Alternatively, the channels 230 may be filled with a resilient material, such as silicon rubber, for example. A mold release material, such as fluorocarbon, for example, is applied to the surface of frame 226 adjacent the mold cavity 228. Then, the mold cavity 228 is filled with a dielectric potting compound 229 such as epoxy resin, for example, which may be applied by any convenient means, such as with a syringe 232, for example.

Figure 6:
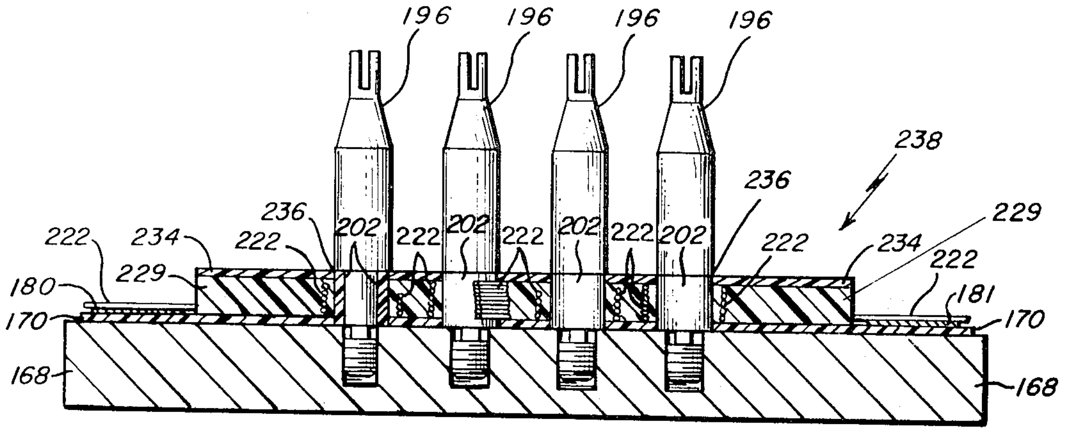
FIG. 6 is an elevational view, partly in section, of the fixture shown in FIG. 5 after the potting frame is removed.

Another dielectric sheet 234, which is similar to sheet 170 less the terminal pad areas thereof, is provided with a plurality of holes 236 which correspond to the respective holes 204 in sheet 170. The sheet 234 is lowered over the fixture 166 and each hole 236 in sheet 234 slidingly engages a respective peg 196. When the sheet 234 is pressed down on the drive wires, such as 222, for example, the respective holes 236 engage the upper ends of respective collars 202. As a result, the drive wires 222 are pressed down around the collars 202 and the upper surface of sheet 234 lies flush with the upper ends of the respective collars 202. Thus, it can be seen that the looseness of the drive lines around the collars 202, as shown in FIG. 6, allows the drive lines to be pressed downward around the collars 202 without breaking. The sheet 234 may be held in place by suitable means, such as a metallic plate (not shown) having holes which slidingly engage the respective pegs 196, for example, and which rests on the upper surface of the potting frame 226. Therefore, the depth of the frame 226 and the mold cavity 228 is set by the heighth of the collars 202 above the sheet 170. The entire assembly, fixture 166 and attached potting frame 226, is placed in an oven which is heated to the proper temperature for curing the potting compound, such as 230 degrees F. for example. During the curing cycle, the potting compound 229 expands slightly. Since the drive wires 222 are not tightly wound around the collars 202, the expansion of the potting compound during curing does not break the drive lines. Thus, the sleeves 202 provide smooth surfaces around the pegs 196 during the winding process, and when removed, provide service loops in the word drive lines 222 which permit the drive lines to be pressed down around the collars 202 when the sheet 234 is assembled and allow the potting compound 229 to expand during the curing cycle without breaking the respective drive lines. After a suitable curing time, such as three hours, for example, the assembly including the fixture 166 and attached potting frame 222 is removed from the oven and allowed to cool to room temperature. If a metallic plate has been used to hold the sheet 234 in place, it is removed and the potting frame 222 is disassembled. All the pegs 196 are removed from the encircling collars 202 which are now bonded between the sheets 170 and 234, respectively, by the cured potting compound. When removed from the fixture 166, the resulting product is a data plane 238 having a plurality of word drive lines 222 embedded in the cured, dielectric, potting material 229 between the opposed dielectric sheets 170 and 234 respectively. Data is stored permanently in the data plane 238 by the geometry of the drive lines 222 which are disposed between and around the dielectric collars 202 in accordance with respective unique winding patterns. One exposed end of each drive line 222 is attached to a respective terminal pad 180 on one extended portion of the data plane 238 and the other exposed end of each drive line 222 is attached to a respective terminal pad 181 on the opposing extended portion of the data plane 238.

Figure 7:
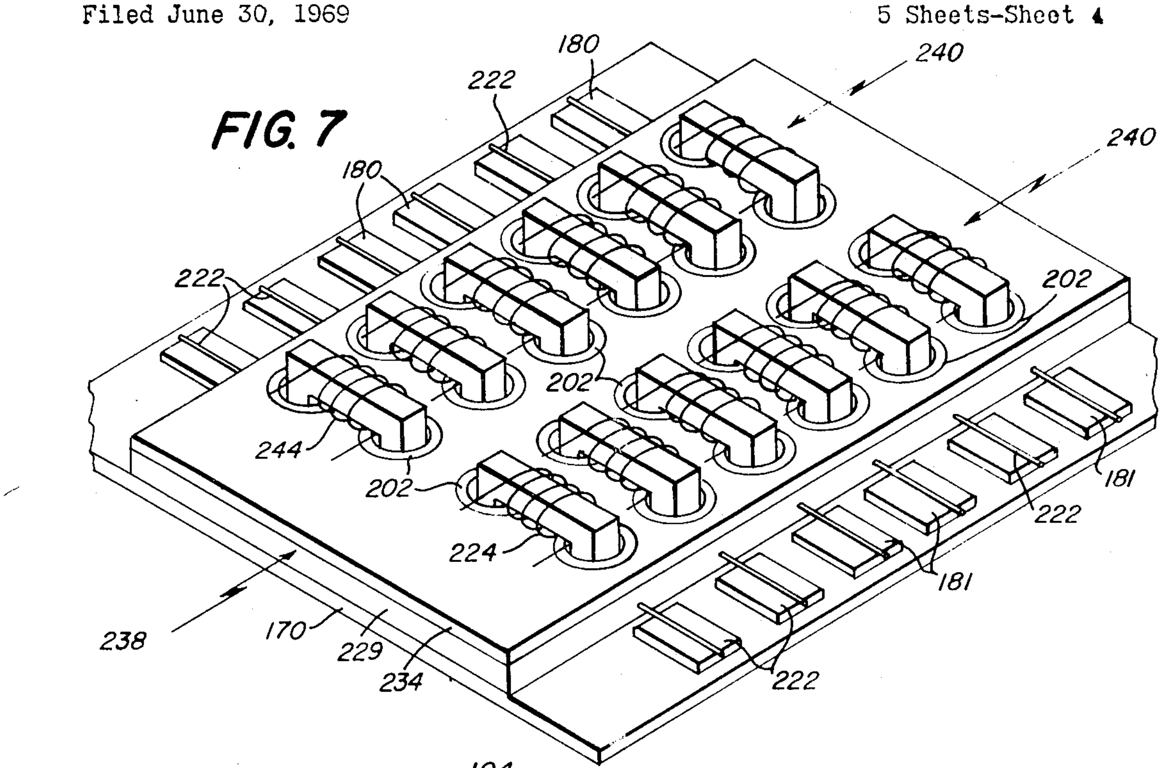
FIG. 7 is an isometric view of a memory plane using the data plane of this invention.

As shown in FIGS. 7 and 8, the data plane 238 is adapted for use with ferrite cores 240, each having a removable portion called a "keeper." Although square-shaped ferrite cores 240 are shown in the preferred embodiment, the data plane 238 may be used with ferrite cores having other configurations, such as circular cores having a removable arcuate portion, for example. The square-shaped ferrite cores 240 comprise a U-shaped portion 242 and a keeper bar 243 which spans the gap between the legs of the U-shaped portion 242, thus providing a closed path for the magnetic flux generated by the core 240. When used with the data plane 238 of this invention, a plurality of U-shaped core portions 242 are supported, as by a fixture, for example, with the respective legs thereof in an upright position. The data plane 238 is lowered over the upright legs of the U-shaped core portions 242 and each collar 202 of the data plane 238 slidingly engages a leg of a U-shaped core portion 242 as the data plane 238 descends. Thus, it can be seen that the collars 202 prevent the drive lines 222 in the data plane from protruding into the apertures which receive the legs of the U-shaped cores 242. When the legs of the respective U-shaped core portions 242 slidingly engage respective collars 202 of the data plane 238, the word drive lines in the data plane are protected from the sharp corners of the core legs by the rigid material of the collars 202. After the data plane 238 is assembled onto the upright legs of the respective magnetic cores 240, the respective keeper portions 243 thereof are bonded to the legs at the open ends thereof. Each keeper bar 242 has wound thereon, a sense winding 244 comprising several turns of wire which is connected to a sense amplifier (not shown). The legs of the U-shaped core portions 242 now occupy the apertures that were filled by the pegs 196 of the core posts 190 during the winding process, and a magnetic core 240 is now disposed in each core position, 1–12 respectively, of the data plane 236. As shown in FIG. 8, the word drive lines 222, which passed between the parallel core posts 190 of a core position now thread through a magnetic core 240. On the other hand, the word drive lines that bypassed a core position, 1–12 respectively, pass around a respective magnetic core 240 now occupying that core position. An electrical current passing through a drive line which threads a magnetic core 240 causes the core to switch from one magnetic remanence state to the other. As a result, a pulse voltage is induced in the sense winding 244 of the core 240 and indicates a stored binary digit "1" for that core position. An electrical current travelling through a drive line 222 which bypasses a magnetic core 240 does not switch that particular core. Consequently, no pulse voltage is induced in the sense winding 244 of the bypassed core and the absence thereof indicates a stored binary digit "0" for that core position. Thus, the data plane 238 with magnetic cores 240 assembled therein comprises a memory plane which may be assembled with other similar memory planes to form a memory stack for a computer. The stored data in a memory plane of this type can be changed by exchanging the data plane 238 for another data plane of the same type but having drive wires therein which are wound differently. Thus, the magnetic cores 240 can be used with other data planes of the same type. The pads 180 and 181 adjacent the respective edges 172 and 173 of the data plane 238 provide means for making electrical connections to either of the respective ends of each drive wire in the data plane. Furthermore, the respective rows of equally spaced pads 180 and 181 along the respective edges 172 and 173 of the data plane 236 are adapted for automatic welding when making electrical connections to the respective drive lines in the data plane 238.

Thus, there has been disclosed herein a wiring apparatus comprising an electrical console having a programmable means for automatically controlling a wiring machine having a coordinately movable table disposed beneath a reciprocating head having wire guiding means for directing a continuous wire toward the table. For use with the wiring apparatus, there has been disclosed a fixture having a base member and a superimposed sheet of dielectric material carrying an array of smooth surfaced core posts and guideposts for defining a plurality of core positions in the final assembly and for directing the wire through the array of core posts and over specific terminal pads on the dielectric sheet, respectively. Each core post has been described herein as comprising a central peg having a reduced diameter portion encircled by a dielectric collar and surrounded by a sleeve of smooth-surfaced dielectric material. In illustrating the use of this fixture with the wiring apparatus, there has been disclosed herein a novel winding process comprising the steps of winding successive word drive lines in one continuous operation and passing each drive line over its respective termination pads, thus eliminating the need for identifying each drive line in the wire braid, subjecting the continuously wound wire to an electrical continuity test to determine if a break in the wire has occurred during the winding process, terminating each drive line on respective underlying terminal pads and removing the intervening lengths of wire that connect the successive word drive lines. A subsequent fabrication process has been described herein as comprising the steps of removing all the guideposts from the fixture, removing all the dielectric sleeves from the core posts, securing a potting frame on the fixture, filling the resulting cavity with dielectric material, such as epoxy resin, for example, lowering another dielectric sheet over the pegs of the core posts and pressing down the respective word drive lines around the dielectric collars, curing the potting material and removing the potting frame. The resulting product has been disclosed herein as a data plane comprising a layer of dielectric material disposed between opposing dielectric sheets and having a plurality of dielectric conduits perpendicularly disposed in the dielectric layer and defining respective through holes in the data plane, and a plurality of word drive lines embedded in the dielectric layer, each word drive line being disposed between the respective dielectric conduits in a unique pattern and having exposed ends fixedly attached to respective terminal pads, which are disposed on opposing extended portions of the data plane.

From the foregoing, it will be apparent that all of the objectives of this invention have been achieved by the structures shown and described. It will be also apparent, however, that various changes may be made by those skilled in the art without departing from the spirit of the invention as expressed in the appended claims. It is to be understood, therefore, that all matter shown and described is to be interpreted as illustrative and not in a limiting sense.

We claim:

1. A machine for performing a plurality of windings from a single continuous wire comprising:
 - a table having a surface;
 - wire guiding means positioned adjacent said surface;
 - means for continuously directing said wire through the wire guiding means and toward said surface during a winding operation;
 - means for moving the wire guiding means relative to said surface during a winding operation; and
 - means for simultaneously and continuously moving said surface relative to the wire guiding means during a complete winding operation.

2. A machine for performing a plurality of windings as set forth in claim 1 wherein said wire guiding means includes a flexible nozzle to prevent abrasion of the wire.

3. A machine for performing a plurality of windings as set forth in claim 2 wherein said means for moving the wire guiding means includes means for moving the flexible nozzle parallel to said surface and means for moving the flexible nozzle toward and away from said surface.

4. A machine for performing a plurality of winds as set forth in claim 1 wherein said wire guiding means includes a jogging head.

5. A machine for performing a plurality of windings as set forth in claim 4 wherein said means for moving the wire guiding means includes means for moving the jogging head parallel to said surface.

6. An apparatus for performing a plurality of windings from a single continuous wire comprising:
 - a table having a surface located in an X–Y coordinate plane;
 - wire guiding means positioned adjacent said surface;
 - means for continuously directing said wire through the wire guiding means and toward said surface;
 - means for continuously moving said surface in the X–Y plane during the entire winding operation;
 - and means for intermittently moving the wire guiding means relative to said surface in accordance with a predetermined program of instructions.

7. An apparatus for performing a plurality of windings from a single continuous wire comprising, in combination:
 - a table having a surface located in an X–Y coordinate plane;
 - a wiring fixture secured to said surface;
 - wire guiding means positioned adjacent said fixture;
 - means for continuously directing said wire through the wire guiding means and toward said fixture during a winding operation;

means for intermittently moving said wire guiding means relative to said fixture during a winding operation; and means for continuously moving said surface in said X–Y plane during a complete winding operation.

8. An apparatus for performing a plurality of windings as set forth in claim 7 and further including predetermined programmable means for controlling said moving means during the entire winding operation.

References Cited

UNITED STATES PATENTS

| | | | |
|---|---|---|---|
| 3,122,178 | 2/1964 | Marine et al. | 140—93 |
| 3,231,967 | 2/1966 | Kreinberg et al. | 29—203 |
| 3,351,102 | 11/1967 | Logan et al. | 140—93 |
| 3,435,858 | 4/1969 | Taysom et al. | 140—92.1 |

THOMAS H. EAGER, Primary Examiner

U.S. Cl. X.R.

140—93